(12) United States Patent
Hamelin

(10) Patent No.: US 7,371,003 B2
(45) Date of Patent: May 13, 2008

(54) MIXER FOOT AND HAND HELD MIXER EQUIPPED WITH THE FOOT

(75) Inventor: Franck Hamelin, Saint Sauveur Lendelin (FR)

(73) Assignee: SEB S.A., Ecully (FR)

( * ) Notice: Subject to any disclaimer, the term of this patent is extended or adjusted under 35 U.S.C. 154(b) by 302 days.

(21) Appl. No.: 10/963,616

(22) Filed: Oct. 14, 2004

(65) Prior Publication Data

US 2005/0078549 A1  Apr. 14, 2005

(30) Foreign Application Priority Data

Oct. 14, 2003  (FR) .................................. 03 11968

(51) Int. Cl.
*A47J 43/044*   (2006.01)

(52) U.S. Cl. .................................... 366/129; 138/96 R

(58) Field of Classification Search ................ 366/129, 366/262, 343; 138/96 R, 96 T
See application file for complete search history.

(56) References Cited

U.S. PATENT DOCUMENTS

| 1,597,635 | A | * | 8/1926 | Stickdorn | .................. | 4/255.08 |
| 2,157,107 | A | * | 5/1939 | Bay | ........................ | 285/213 |
| 2,215,251 | A | * | 9/1940 | Prince | ...................... | 138/96 T |
| 2,619,278 | A | * | 11/1952 | Ackerman | .................. | 417/160 |
| 3,330,539 | A | * | 7/1967 | Lurski | ........................ | 416/171 |
| 5,863,118 | A | * | 1/1999 | Ackels et al. | ................ | 366/129 |
| 6,186,656 | B1 | * | 2/2001 | Penaranda et al. | .......... | 366/129 |
| 6,257,752 | B1 | * | 7/2001 | Browne | ...................... | 366/129 |
| 6,273,602 | B1 | * | 8/2001 | Steiner et al. | .............. | 366/129 |
| 6,293,691 | B1 | * | 9/2001 | Rebordosa et al. | ......... | 366/129 |
| 6,398,403 | B1 | * | 6/2002 | Rebordosa et al. | ......... | 366/129 |
| 2002/0034121 | A1 | | 3/2002 | Rebordosa et al. | | |
| 2002/0093210 | A1 | * | 7/2002 | Sassone et al. | ................ | 294/7 |
| 2005/0111296 | A1 | * | 5/2005 | Rutigliano et al. | ......... | 366/129 |
| 2005/0128865 | A1 | * | 6/2005 | Chiappetta | ................. | 366/129 |

FOREIGN PATENT DOCUMENTS

| DE | 11 07 907 B | 5/1961 |
| DE | 11 85 345 B | 1/1965 |
| EP | 1 232 712 A2 | 8/2002 |
| FR | 2 553 278 A1 | 4/1985 |
| GB | 765 427 A | 1/1957 |

* cited by examiner

*Primary Examiner*—David Sorkin
(74) *Attorney, Agent, or Firm*—Browdy and Neimark

(57) ABSTRACT

A foot component of a hand mixer or blender, the hand mixer or blender having a case that houses a motor and the foot component being constructed to be coupled to the case. The foot component is composed of: a tube having a lower end; a bell made of a first material connected to the lower end of the tube, the bell having a lower edge; and a protection element covering the lower edge of the bell and made of a material that is softer than the first material.

17 Claims, 2 Drawing Sheets

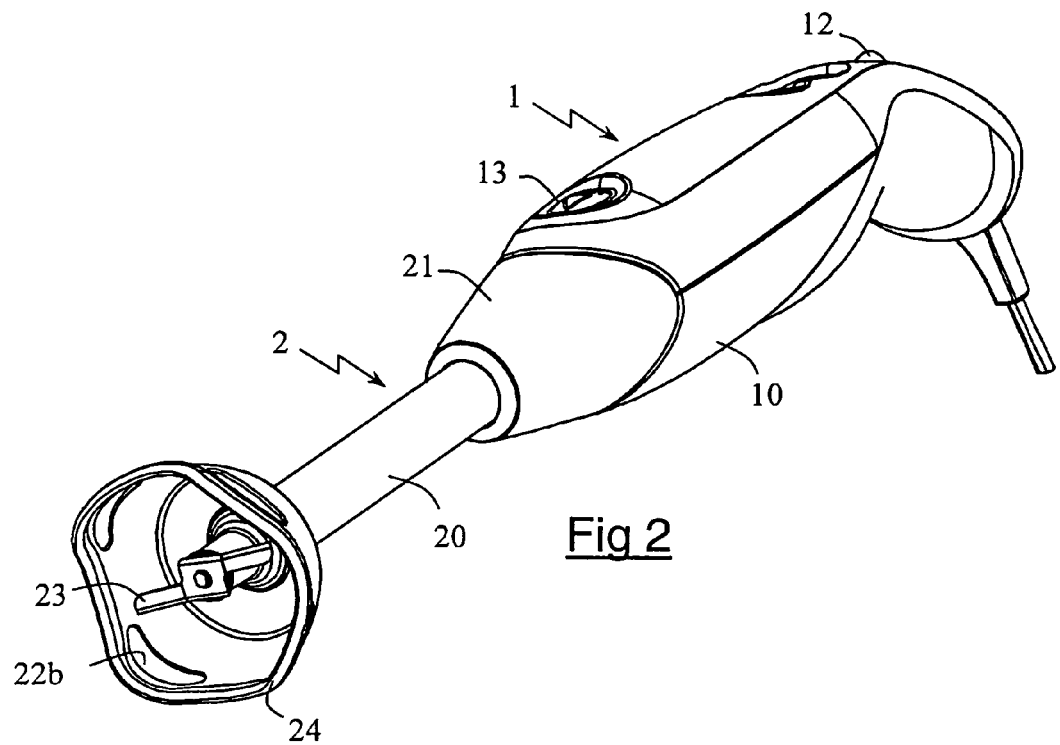
Fig 2
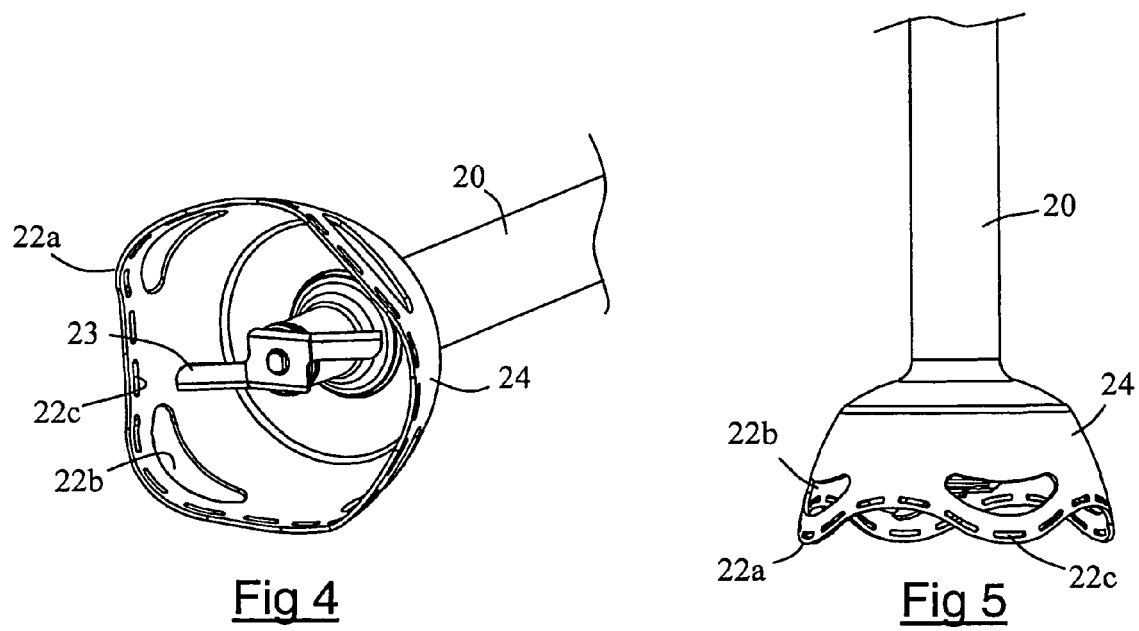
Fig 4
Fig 5

MIXER FOOT AND HAND HELD MIXER EQUIPPED WITH THE FOOT

BACKGROUND OF THE INVENTION

The present invention relates to hand held, or immersion, mixers or blenders for household use, and particularly relates to a foot, or base, for such mixer.

Mixers, or blenders, of this type are well known in the art and are currently in wide use. They include a foot that is coupled to a housing, or case, that encloses a motor. The foot is generally composed of a cylindrical tube having a lower part in the form of a bell that encloses a mixing tool, such as a blade. The tool is coupled to an output shaft of the motor. In use, the tool is rotated at a high speed and is immersed within a quantity of food being prepared to perform cutting, mixing, blending, etc.

In the higher quality appliances of this type, the mixing foot is made of a metal, such as stainless steel, which material has the advantages of high rigidity, good heat resistance and an attractive appearance.

However, a stainless steel mixing foot has the drawback that the user must be very careful when using the appliance to mix products in a vessel having a fragile coating, such as a casserole provided with a non-stick coating, in order to avoid damaging the coating. In effect, the material of the bell being very hard, there is a considerable risk that the bell will scratch the coating of the receptacle during use.

BRIEF SUMMARY OF THE INVENTION

The present invention provides a foot component of a hand mixer or blender, the hand mixer or blender having a case that houses a motor and the foot component being constructed to be coupled to the case. The foot component comprises: a tube having a lower end; and a bell made of a first material connected to the lower end of the tube, the bell having a lower edge. According to the invention, the above-mentioned drawbacks are overcome by the provision of a protection element covering the lower edge of the bell and made of a material that is softer than the first material.

The physical properties of the protection strip present the advantage that the surface coming primarily in contact with the receptacle is of a material that is less abrasive than that of the bell itself. As a result, the risk of damage to the receptacle is reduced, or even eliminated.

According to embodiments of the invention, the bell, aside from the protection element, is made of stainless steel, which gives the bell the desired characteristics mentioned above.

Also in embodiments of the invention, the tube of the mixing foot is made of stainless steel, which provides a great rigidity and a pleasing appearance.

According to embodiments of the invention, the protection element is made of a plastic material, which can be manufactured at low cost. In further accordance with the invention, the protection element can be overmolded on the bell, which provides a secure and permanent attachment between the element and the bell.

In further accordance with the invention, the part of the bell that is covered by the protection element is given a specific surface state that enhances the attachment of the protection element to the bell. This reinforces the attachment of the protection element to the bell. The specific surface state can be, in the form of bumps, and/or surface roughening in the region that will be joined to the protection element.

According to yet another feature of the invention, the part of the bell that is covered by the protection element has openings that can be filled with the material of the protection element during overmolding, thereby forming bridges of the protection element material that constitute points at which the protection material extends through the openings to be positively anchored to the bell.

In still further accordance with the invention, the above-mentioned openings have an elongated form extending parallel to the lower edge of the bell.

According to yet another feature of the invention, the lower edge of the bell has an undulating form in the axial direction such that the bell presents, when viewed from the side, projecting lobes in alternation with recessed parts. This feature promotes circulation of the food product being processed while reducing the area of contact between the bell and the receptacle in which the mixer or blender is being used.

In addition, the present invention concerns a household electric appliance having a case enclosing an electric motor and coupled to a mixing foot having the form described above.

BRIEF DESCRIPTION OF THE DRAWINGS

FIG. 2 is a perspective view of the embodiment of FIG. 1.

FIG. 4 is a perspective detail view of the mixer foot shown in FIG. 1, with its protection element removed.

FIG. 5 is an elevational view of the mixer foot with the protection element removed.

DETAILED DESCRIPTION OF THE INVENTION

Figure 1:
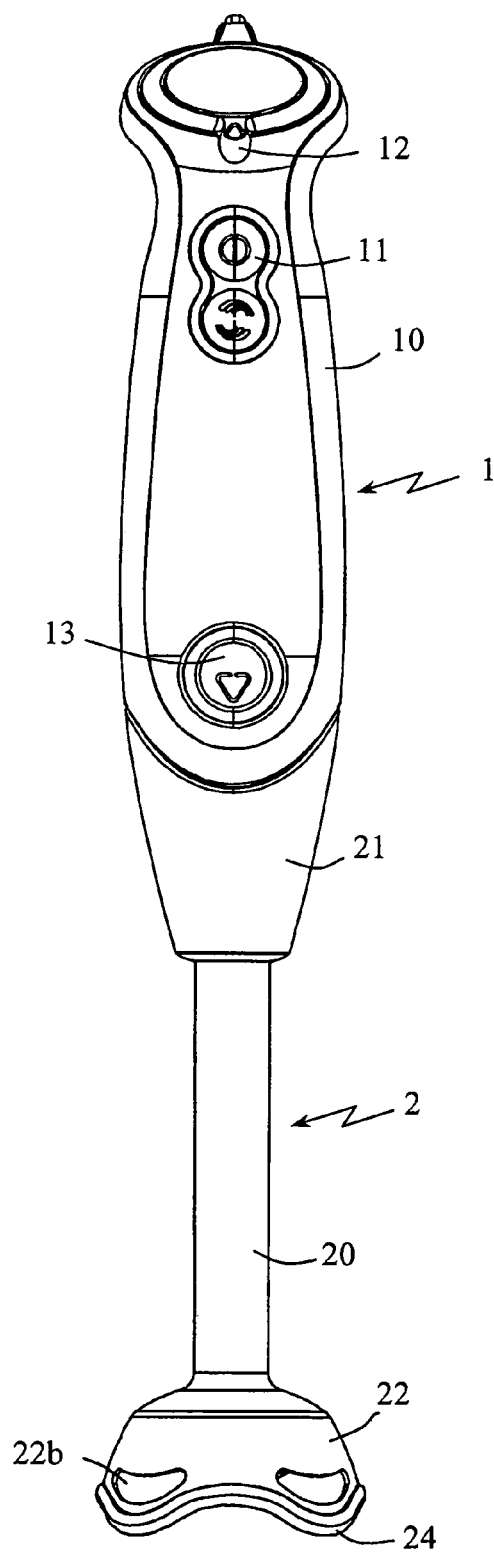
FIG. 1 is an elevational view of a hand held mixer or blender equipped with a foot according to the invention.

In the drawings, only those components that are necessary for an understanding of the invention by those skilled in the art are shown.

FIGS. 1 and 2 show a hand held mixer or blender having a case 1 that is composed of a body 10 of substantially oblong form. Body 10 houses, in a known manner, a motor (not shown). The motor has an output shaft extending along the longitudinal axis of the case and the free end of the output shaft is coupled to a rotatable driver facing an opening formed in the lower part of case 1. Case 1 carries a button 11 for operating the motor and a wheel, or knob, or dial, 12 for controlling the motor rotation speed.

At the lower part of case 1 there is mounted, in a removable manner, a mixing foot 2 that includes a tube 20, preferably made of stainless steel, having an upper part provided with a coupling piece 21, preferably made of plastic material, constructed for connecting foot 2 to case 1.

The outer surface of coupling piece 21 has a tapered form that forms a prolongation of body 10. The upper edge of piece 21 has an undulating form complementary to the form of the lower edge of case 1.

Figure 3:
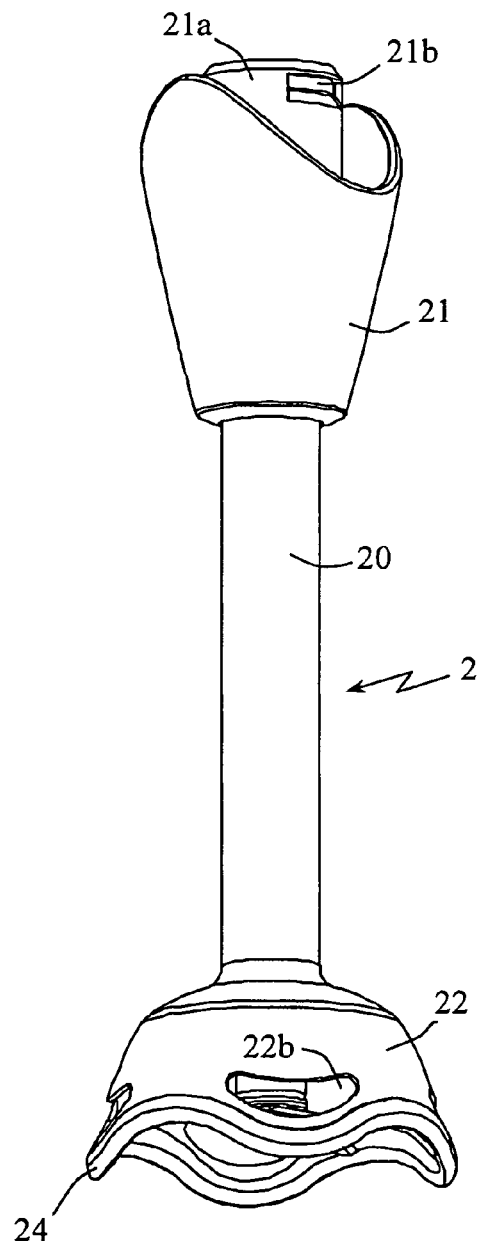
FIG. 3 is a view of the foot portion of the appliance in FIG. 1, shown to a slightly larger scale.

Referring to FIG. 3, coupling piece 21 has a connection sleeve 21a furnished with notches, or recesses, 21b that cooperate with latching tongues (not shown) carried by case 1 to assure a rigid, but releasable, connection of foot 2 with case 1. Such connecting structures are already well known in the art. Foot 2 can be uncoupled from case 1 by pressing on a button 13 carried by case 1, permitting the latching tongues to disengage from notches 21b.

The lower part of the mixing foot has a bell 22, preferably made of stainless steel, surrounding and enclosing a mixing tool 23, such as a blade, fixed to a shaft whose upper end is coupled to the rotatable driver housed in case 1.

The lower edge 22a of bell 22 has an undulating form in the direction of the longitudinal axis of the mixing foot so that lower edge 22a, when viewed from the side, as in FIG. 5, presents lobes that alternate with recessed parts that are spaced from the lobes in the direction of the longitudinal axis of the foot. The lobes are provided with openings 22b, each having substantially a reniform, or kidney, shape and provided to aid circulation of the product being mixed.

According to a particular feature of the invention, lower edge 22a of bell 22 is covered with a protection element in the form of a strip 24 that covers the bottom edge, the outer peripheral surface region and the inner peripheral surface region of lower edge 22a. Protection strip 24 is made of a relatively soft material and is advantageously secured to bell 22 by overmolding. Strip 24 can be made, for example, of a plastic material such as polyamide containing 15j % of glass fibers. By way of non-limiting example, strip 24 may be made of polyamide PA66 with 15% reinforcing fibers as marketed by the RHODIA company under the reference TECHNYL A216V15.

In the particular embodiment shown in FIGS. 4 and 5, bell 22 also has, in its lower edge region, elongated openings, or slots, 22c spaced apart around the periphery of the bell and located in the zone that will be covered by strip 24. Openings 22c help to strengthen the attachment of strip 24 to bell 22 by permitting, during overmolding of strip 24, the formation of bridges of plastic material that connect the inner and outer parts of strip 24.

Such a mixing foot made of stainless steel has the advantage of being able to be used in a vessel that has a fragile coating, such as a non-stick coating, without risk of harming the coating. In effect, the protection strip is the part that will come in contact with the vessel when the mixer is being used to process food products. Since the protection strip is of a relatively soft material, it will not have an abrasive effect on a fragile coating such as a non-stick coating. The mixing foot according to this particular embodiment of the invention has moreover the advantage of retaining the appearance and rigidity properties of a stainless steel mixing foot.

Of course, the invention is not in any way limited to the specific embodiment, which has been described and illustrated solely by way of example. Modifications remain possible, particularly with regard to the composition of the various components or by replacement with equivalent manufacturing techniques, without departing from the framework of the invention.

Thus, in one variation not illustrated, the portion of the surface of the bell that is to be covered by the protection strip can have surface irregularities instead of, or in addition to, openings 22c. For example, the peripheral edge region of the bell could be provided with ridges or grooves extending substantially parallel to the lower edge of the bell, which will also improve the attachment of a protection strip attached by overmolding.

According to another variation that is not illustrated, the protection strip can be constituted by an independently fabricated part that is then bonded or cemented to the lower edge of the bell.

According to yet another variation, the protection strip can be a separately fabricated piece of a relatively rigid plastic material that is connected to the bell by means of snap fasteners cooperating with suitable recesses formed in the surface of the bell.

Finally, according to another variation, the mixing foot itself can be made of materials other than stainless steel, for example a rigid plastic material. The bell and the tube of the mixing foot can also be made of respectively different materials.

This application relates to subject matter disclosed in French Application number FR 03 11968, filed on Oct. 14, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A foot component of a hand mixer or blender, the hand mixer or blender having a case that houses a motor and the foot component being constructed to be coupled to the case, said foot component comprising:
   a tube having a lower end and an upper end;
   a bell made of a first material connected to said lower end of said tube, said bell having a lower edge that includes a bottom edge, an outer peripheral edge region and an inner peripheral edge region; and
   a protection element covering acid bottom edge, said outer peripheral edge region and said inner peripheral edge region of said lower edge of said bell, said protection element being permanently attached to said bell and being made of a material that is softer than said first material, wherein said tube comprises, at said upper end, means for connecting said foot component to the case, the part of said bell that is covered by said protection element has openings. and portions of said protection element extend through said openings.

2. The foot component of claim 1, wherein said bell is made of stainless steel.

3. The foot component of claim 2, wherein said tube is made of stainless steel.

4. The foot component of claim 3, wherein said protection element is made of a plastic material.

5. The foot component of claim 4, wherein said protection element is overmolded on said bell.

6. The foot component of claim 5, wherein the part of said bell that is covered by said protection element is given a specific surface state that enhances the attachment of said protection element to said bell.

7. The foot component of claim 6, wherein said openings have an elongated form extending parallel to the lower edge of said bell.

8. The foot component of claim 7, wherein said lower edge of said bell has an undulating form in the axial direction of said tube such that said bell presents, when viewed from the side, projecting lobes in alternation with recessed parts.

9. The foot component of claim 1, wherein said openings have an elongated form extending parallel to the lower edge of said bell.

10. The foot component of claim 1, wherein said protection element is made of a plastic material.

11. The foot component of claim 10, wherein said protection element is overmolded on said bell.

12. The foot component of claim 11, wherein said openings have an elongated form extending parallel to the lower edge of said bell.

13. The foot component of claim 1, wherein the part of said bell that is covered by said protection element is given a specific surface state that enhances the attachment of said protection element to said bell.

14. The foot component of claim 13, wherein said openings have an elongated form extending parallel to the lower edge of said bell.

15. The foot component of claim 1, wherein said lower edge of said bell has an undulating form in the axial direction of said tube such that said bell presents, when viewed from the side, projecting lobes in alternation with recessed parts.

16. A household electric appliance comprising: a case enclosing an electric motor; and a foot component coupled to said case, wherein said foot component comprises:

a tube having a lower end;

a bell made of a first material connected to said lower end of said tube, said bell having a lower edge that includes a bottom edge, an outer peripheral edge region and an inner peripheral edge region; and a protection element covering said bottom edge, said outer peripheral edge region and said inner peripheral edge region of said lower edge of said bell, said protection element being permanently attached to said bell and being made of a material that is softer than said first material, wherein the part of said bell that is covered by said protection element has openings, and portions of said protection element extend through said openings.

17. The household electric appliance of claim 16, wherein: said bell is made of stainless steel; said tube is made of stainless steel; and said protection element is made of a plastic material.

* * * * *